(12) United States Patent
Dimmick, III et al.

(10) Patent No.: US 9,181,810 B2
(45) Date of Patent: Nov. 10, 2015

(54) SYSTEM AND METHOD FOR COVERING A BLADE MOUNTING REGION OF TURBINE BLADES

(75) Inventors: John Herbert Dimmick, III, Greenville, SC (US); Raymond Joseph Lecuyer, Taylors, SC (US); Norman K. Austin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 728 days.

(21) Appl. No.: 13/448,273

(22) Filed: Apr. 16, 2012

(65) Prior Publication Data

US 2013/0272886 A1    Oct. 17, 2013

(51) Int. Cl.
  *F01D 5/32*    (2006.01)
  *F01D 5/30*    (2006.01)
  *F01D 11/00*   (2006.01)

(52) U.S. Cl.
  CPC ............ *F01D 5/3015* (2013.01); *F01D 11/006* (2013.01); *F05D 2230/64* (2013.01); *Y02T 50/671* (2013.01)

(58) Field of Classification Search
  CPC .............................. F01D 5/3015; F01D 11/006
  USPC ............... 416/204 A, 219 R, 220 R, 221, 500
  See application file for complete search history.

(56) References Cited

U.S. PATENT DOCUMENTS

| | | | |
|---|---|---|---|
| 3,501,249 A | | 3/1970 | Scalzo et al. |
| 3,572,966 A | * | 3/1971 | Borden et al. .................. 416/95 |
| 4,507,052 A | * | 3/1985 | Thompson ................. 416/193 A |
| 4,523,890 A | * | 6/1985 | Thompson ........................ 416/95 |
| 5,967,745 A | | 10/1999 | Tomita et al. |
| 6,086,329 A | | 7/2000 | Tomita et al. |
| 6,120,249 A | | 9/2000 | Hultgren et al. |
| 6,189,891 B1 | | 2/2001 | Tomita et al. |
| 6,220,814 B1 | | 4/2001 | Brushwood et al. |

(Continued)

FOREIGN PATENT DOCUMENTS

| | | |
|---|---|---|
| EP | 1944472 A1 | 7/2008 |
| EP | 2239419 A1 | 10/2010 |
| WO | 2007028703 A1 | 3/2007 |

OTHER PUBLICATIONS

McNeely, Mark, Siemens' H-class Progresses Toward Production, Diesel & Gas Turbine Worldwide, Jan.-Feb. 2006, p. 66.

(Continued)

*Primary Examiner* — Dwayne J White
*Assistant Examiner* — Justin Seabe
(74) *Attorney, Agent, or Firm* — Fletcher Yoder, P.C.

(57) ABSTRACT

A system includes a cover segment set configured to mount in first and second grooves circumferentially along a blade mounting region of a turbine rotor. The cover segment set includes a seal segment and a cover segment. The seal segment has a seal body with a lock feature, wherein the seal segment is configured to mount circumferentially along the second groove. The cover segment includes first and second lips extending along first and second circumferential portions of a cover body. The first and second lips are at an offset from one another. The first lip is configured to mount circumferentially along the first groove, the second lip is configured to mount circumferentially along the second groove adjacent the seal segment, and the second lip includes a mating lock feature configured to couple with the lock feature of the seal body.

3 Claims, 7 Drawing Sheets

(56) References Cited

U.S. PATENT DOCUMENTS

| | | |
|---|---|---|
| 6,273,683 B1 | 8/2001 | Zagar et al. |
| 6,315,301 B1 | 11/2001 | Umemura et al. |
| 6,416,282 B1 | 7/2002 | Beeck et al. |
| 6,481,967 B2 | 11/2002 | Tomita et al. |
| 6,561,764 B1 | 5/2003 | Tiemann |
| 6,945,749 B2 | 9/2005 | De Cardenas |
| 7,090,461 B2 | 8/2006 | Liang |
| 7,264,448 B2 | 9/2007 | Garner |
| 7,566,201 B2 * | 7/2009 | Brillert et al. ............. 416/221 |
| 7,857,593 B2 * | 12/2010 | Garin et al. ............. 416/220 R |
| 8,128,371 B2 | 3/2012 | Ravi et al. |
| 2005/0281667 A1 | 12/2005 | Liang |
| 2007/0014668 A1 | 1/2007 | Engle |
| 2007/0080505 A1 | 4/2007 | Nereim |
| 2008/0008584 A1 | 1/2008 | Shteyman et al. |
| 2008/0181767 A1 | 7/2008 | Brillert et al. |
| 2008/0196247 A1 * | 8/2008 | Ravi et al. ............. 29/889.2 |
| 2010/0047073 A1 * | 2/2010 | Bluck et al. ............. 416/220 R |
| 2010/0196164 A1 | 8/2010 | Liotta et al. |
| 2010/0215501 A1 | 8/2010 | Ammann |
| 2010/0232938 A1 * | 9/2010 | Harris et al. ............. 415/173.1 |
| 2011/0163506 A1 * | 7/2011 | Hafner ............. 277/309 |

OTHER PUBLICATIONS

Ratliff, Phil, Paul Garbett, Willibald Fischer, The New Siemens Gas Turbine SGT5-8000H for More Customer Benefit, VGB PowerTech, Sep. 2007, p. 128.

Search Report and Written Opinion from EP Application No. 13162854.7 dated Aug. 27, 2013.

\* cited by examiner

SYSTEM AND METHOD FOR COVERING A BLADE MOUNTING REGION OF TURBINE BLADES

BACKGROUND OF THE INVENTION

The subject matter disclosed herein relates to gas turbine engines, and more specifically, to covering a blade mounting region of compressor or turbine blades.

In general, gas turbine engines combust a mixture of compressed air and fuel to produce hot combustion gases. The combustion gases may flow through one or more turbine stages to generate power for a load and/or a compressor. Each turbine stage may include multiple turbine blades with cover plates disposed circumferentially around a rotor. Unfortunately, any bolts, screws, pins or other fasteners used to secure the cover plates to the turbine blades are susceptible to inadvertently falling into the gas turbine engine during maintenance. For example, certain maintenance procedures involve removing cover plates to access turbine blades or various components of the turbine. Such procedures generally include removing the fasteners that secure the cover plates to the rotor. Therefore, the more cover plate fasteners employed, the greater the possibility that these fasteners will be dropped into the turbine during or after removal. If fasteners fall into inaccessible areas of the turbine, further disassembly may be necessary to remove the parts, thereby delaying turbine operation and increasing maintenance costs.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine having a turbine rotor, a plurality of blades, and a segmented cover assembly. The turbine rotor includes a blade mounting region with a plurality of blade mounts disposed circumferentially about a rotational axis of the turbine rotor, and first and second grooves extending circumferentially along the blade mounting region at a radial offset from one another relative to the rotational axis. The plurality of blades is disposed in the plurality of blade mounts. The segmented cover assembly includes a plurality of cover segment sets configured to mount in the first and second grooves circumferentially along the blade mounting region. Each cover segment set includes a seal segment and a cover segment. The seal segment has a seal body with a lock feature, wherein the seal segment is configured to mount circumferentially along the second groove. The cover segment includes first and second lips extending along first and second circumferential portions of a cover body. The first lip is configured to mount circumferentially along the first groove, the second lip is configured to mount circumferentially along the second groove adjacent the seal segment, and the second lip includes a mating lock feature configured to couple with the lock feature of the seal body.

In a second embodiment, a system includes a cover segment set configured to mount in first and second grooves circumferentially along a blade mounting region of a turbine rotor. The cover segment set includes a seal segment and a cover segment. The seal segment has a seal body with a lock feature, wherein the seal segment is configured to mount circumferentially along the second groove. The cover segment includes first and second lips extending along first and second circumferential portions of a cover body. The first and second lips are at an offset from one another. The first lip is configured to mount circumferentially along the first groove, the second lip is configured to mount circumferentially along the second groove adjacent the seal segment, and the second lip includes a mating lock feature configured to couple with the lock feature of the seal body.

In a third embodiment, a method includes mounting a cover segment set in first and second grooves circumferentially along a blade mounting region of a turbine rotor. Mounting includes inserting a seal segment into the second groove, where the seal segment includes a lock feature. Mounting also includes inserting a first lip of a cover segment into the first groove and inserting a second lip of the cover segment into the second groove adjacent the seal segment. The first and second lips extend along first and second circumferential portions of a cover body at an offset from one another. Mounting also includes locking the cover segment to the seal segment to form a cover segment set via coupling of the lock feature with a mating lock feature of the second lip.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments provide a system and method of a segmented cover assembly for a turbine rotor to shield part of the turbine rotor from hot exhaust gases, to seal a coolant flow to cool parts of the turbine rotor, damp vibration of the cover assembly, and/or axially retain turbine blades mounted in a plurality of blade mounts. The segmented cover assembly may have a plurality of cover segment sets, each cover segment set having a seal segment and a cover segment. The seal segment may have a lock feature (e.g., lock recess) and the cover segment may have a mating lock feature (e.g., lock tab). The cover segment set may be configured to mount along circumferential grooves of a turbine blade mounting region in an installation position. For example, a first lip of the cover segment may be configured to rotate within a first groove to move a second lip of the cover segment toward or away from the other groove. A removed portion of turbine rotor may be configured to permit the lock feature and mating lock feature to couple within the circumferential grooves of the blade mounting region in the installation position. The removed portion and turbine blade mounts may be formed in the turbine rotor at substantially the same time. The turbine blade mounts may be substantially axial blade slots, such as dovetail slots that mate with dovetail protrusions of a dovetail joint. Substantially axial blade slots may be parallel the axis of the turbine or up to approximately 30 degrees from parallel to the axis.

The coupled seal segment and cover segment may rotate circumferentially along the grooves from the installation position to an intermediate position. The circumferential grooves may radially oppose each other. In the intermediate position, the cover segment set may be radially and axially retained within the grooves of the blade mounting region. At least one fastener may circumferentially retain each cover set or the entire cover assembly in the intermediate position. The cover segment sets may be configured to extend over at least one blade mounts (e.g., 1, 2, 3, 4, 5, or more) of the turbine rotor. The segmented cover assembly may substantially cover the plurality of blade mounts. The cover segment sets may have a minimal number of parts, providing for a simple method to shield the turbine rotor, seal coolant flow, damp vibration, and axially retain turbine blades. The simple method of assembling the cover assembly may be structurally robust and easy to install and remove in the field. The minimal number of parts, particularly small parts, may reduce the possibility that parts may be dropped into the turbine engine during maintenance that may require additional maintenance time to retrieve.

Figure 1:
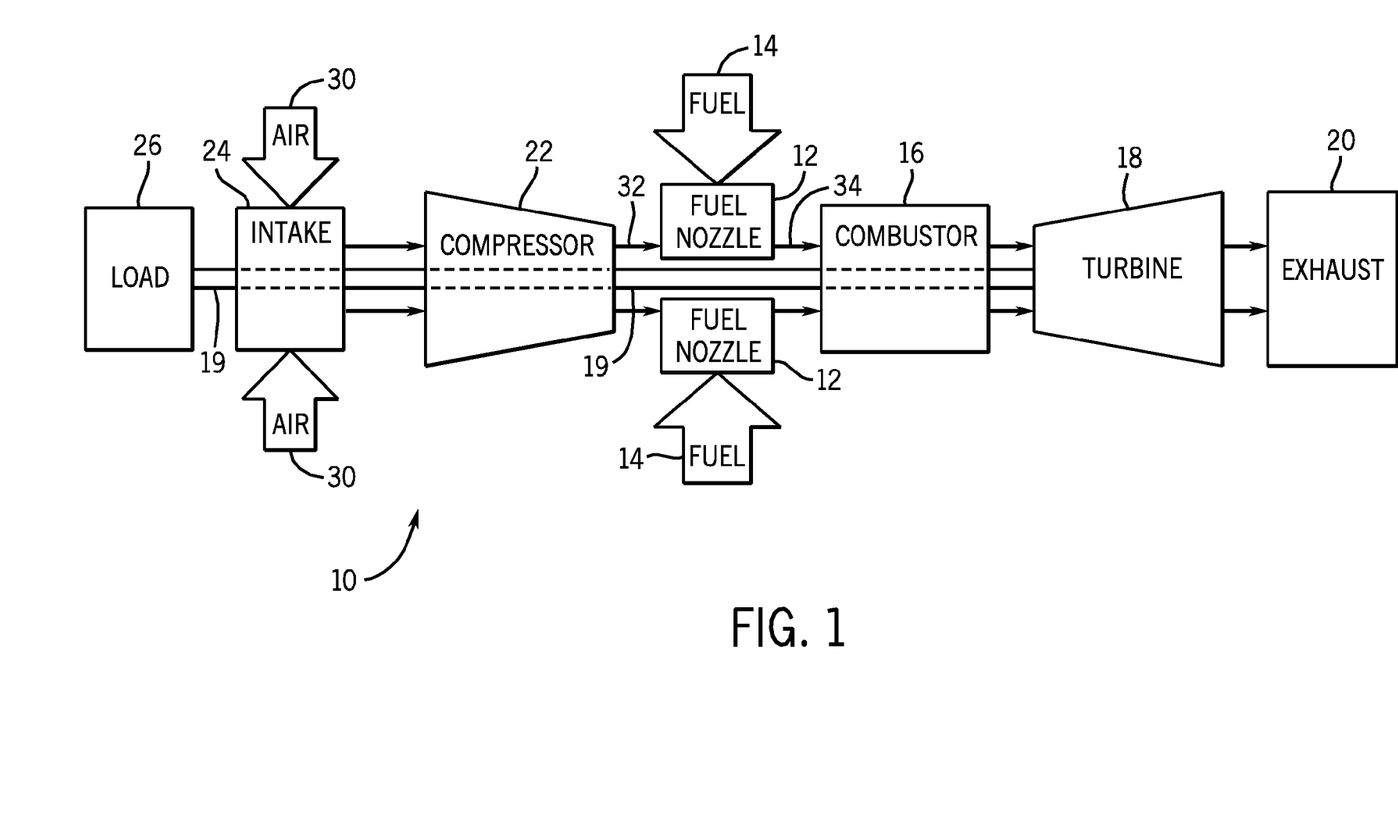
FIG. 1 is a block diagram of an embodiment of a turbine system having a compressor or turbine that includes the segmented cover assembly.

Turning now to the drawings and referring first to FIG. 1, a block diagram of an embodiment of a gas turbine system 10 is illustrated. The diagram includes fuel nozzle 12, fuel 14, and combustor 16. As depicted, fuel 14 (e.g., a liquid fuel and/or gas fuel, such as natural gas) is routed to the turbine system 10 through fuel nozzle 12 into combustor 16. The combustor 16 ignites and combusts the air-fuel mixture 34, and then passes hot pressurized exhaust gas 36 into a turbine 18. The exhaust gas 36 passes through turbine blades of a turbine rotor in the turbine 18, thereby driving the turbine 18 to rotate. In the present embodiment, a segmented cover assembly is mounted on the turbine rotor adjacent to the turbine blades to block hot exhaust gases 36 from entering a turbine rotor that couples the turbine blades to a shaft 19. As discussed in detail below, embodiments of turbine system 10 include certain structures and components within turbine 18 that reduce the number of parts connecting a segmented cover assembly to stages of turbine 18. The coupling between blades in turbine 18 and shaft 19 will cause the rotation of shaft 19, which is also coupled to several components (e.g., compressor 22, load 26) throughout the turbine system 10. Eventually, the exhaust gases 36 of the combustion process may exit the turbine system 10 via exhaust outlet 20.

In an embodiment of turbine system 10, compressor vanes or blades are included as components of compressor 22. Blades within compressor 22 may be coupled to shaft 19, and will rotate as shaft 19 is driven to rotate by turbine 18. Compressor 22 may intake air 30 to turbine system 10 via an air intake 24. Further, shaft 19 may be coupled to load 26, which may be powered via rotation of shaft 19. As appreciated, load 26 may be any suitable device that may generate power via the rotational output of turbine system 10, such as a power generation plant or an external mechanical load. For example, load 26 may include an electrical generator, a propeller of an airplane, and so forth. The air intake 24 draws air 30 into the turbine system 10 via a suitable mechanism, such as a cold air intake, for subsequent mixture of air 30 with fuel 14 via fuel nozzle 12. Air 30 taken in by turbine system 10 may be fed and compressed into pressurized air 32 by rotating blades within compressor 22. The pressurized air 32 may then be fed into one or more fuel nozzles 12. Fuel nozzles 12 may then mix the pressurized air 32 and fuel 14, to produce a suitable air-fuel mixture 34 for combustion, e.g., a combustion that causes the fuel 14 to more completely burn, so as not to waste fuel 14 or cause excess emissions in the exhaust gases 36. Again, the turbine 18 is driven by the exhaust gases 36, and each stage of the turbine 18 may include the segmented cover assembly described in detail below.

Figure 2:
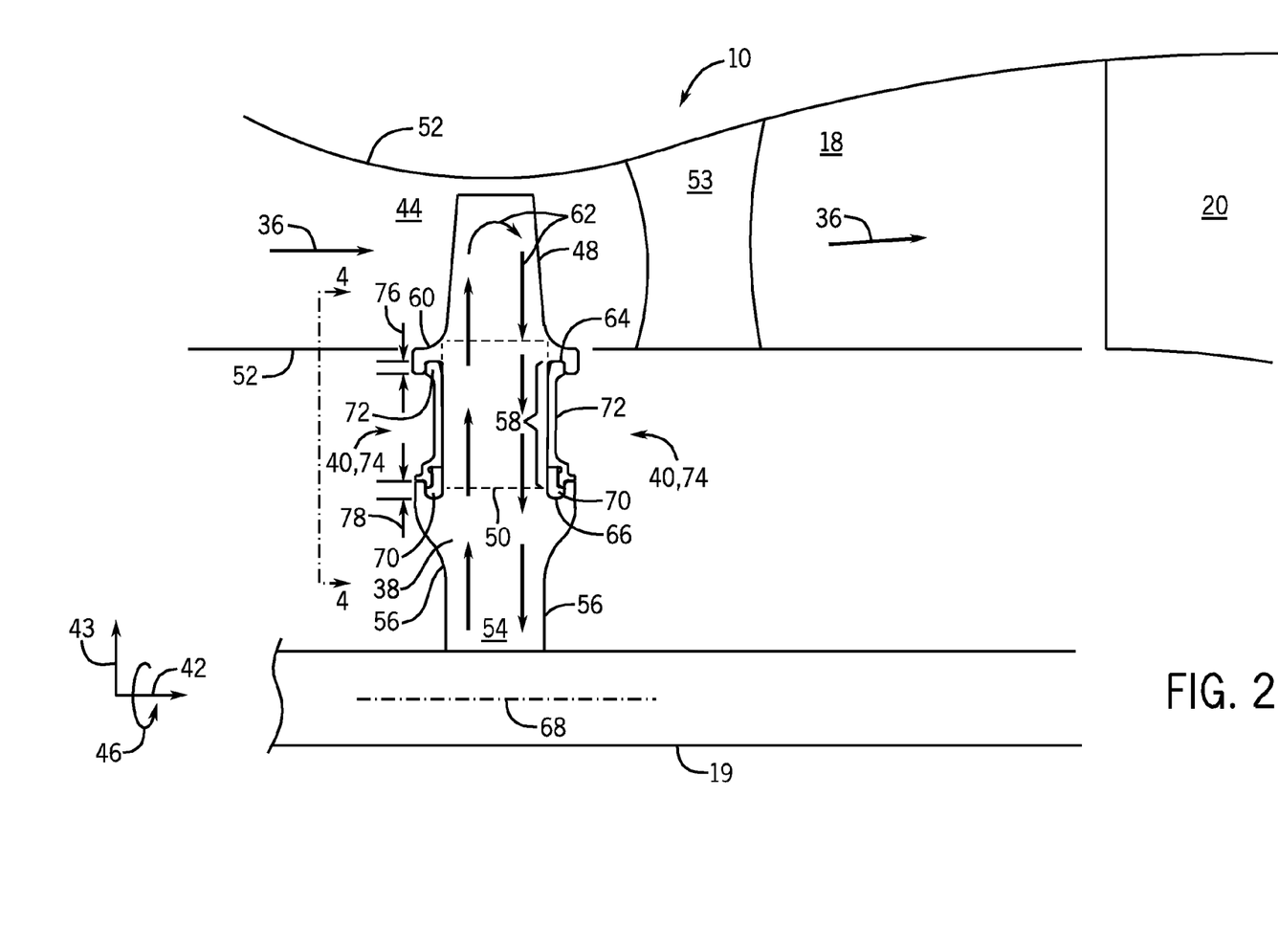
FIG. 2 is a partial cross-sectional view of an embodiment of a turbine including the segmented cover assembly located in a blade mounting region of the turbine rotor.

FIG. 2 presents a cross-sectional view of turbine 18 illustrating a turbine rotor 38 having at least one segmented cover assembly 40. Hot exhaust gas 36 flows into the turbine 18 in an axial direction 42 through a turbine nozzle 44, causing the turbine rotor 38 coupled to the shaft 19 to rotate in a circumferential direction 46. In some embodiments, the turbine 18 may have multiple stages of turbine rotors 38. For example, other turbines 18 may include 1, 2, 3, 4, 5, 6, or more turbine stages. Each turbine stage includes a nozzle 44 and a plurality of turbine blades 48 substantially equally spaced in the circumferential direction 46 about the turbine rotor 38 in a plurality of turbine blade mounts 50. The nozzle body 52 of the turbine 18 may direct exhaust gases 36 towards the turbine blades 48 of one stage into the turbine blades 48 of a subsequent stage, through a stator 53, or into the exhaust outlet 20 after the final stage. As the exhaust gases 36 flow through each turbine stage directed by the nozzle body 52, energy from the exhaust gases 36 is converted into rotational energy of the turbine rotor 38 and shaft 19. After passing through each turbine stage, the exhaust gases 36 exit the turbine 18 in the axial direction 42.

The turbine rotor 38 of each stage includes a rotor body 54 with two rotor faces 56 (e.g., upstream and downstream faces). The plurality of turbine blade mounts 50 may be radially disposed in the blade mounting region 58 at an outer perimeter 60 of the rotor body 54. In an embodiment, the plurality of turbine blade mounts 50 (e.g., dovetail slots) may include a plurality of axial blade slots 50 extending between the two rotor faces 56. Axial blade slots may substantially restrict any movement of any axially mounted turbine blade 48 relative to the turbine rotor 38 except movement parallel to the slot axis (e.g., axial direction 42). Mounted turbine blades 48 may extend in a radial direction 43. In some embodiments, a coolant flow (e.g. cooling air) 62 may circulate through the turbine rotor 38 and through the plurality of turbine blades 48 as generally indicated by the arrows 62. The cooling air 62 may come from the compressor 22 or from another pressurized air source. Each rotor face 56 (e.g., upstream and/or downstream faces) may have a first groove 64 and a second groove 66. In some embodiments, both rotor faces 56 may have a first 64 and a second 66 groove. Both the first and second grooves 64, 66 may extend circumferentially 46 along the blade mounting region 58. The blade mounting region 58 may include the blade mounts 50 and part of the rotor body 54 between blade mounts 50. In an embodiment, the first groove 64 may be at a greater radial 43 offset from a rotational axis 68 than the second groove 66 such that the first groove 64 is nearer to the outer perimeter 60. Additionally, in some embodiments, the first groove 64 and second groove 66 may radially 43 oppose each other. For example, the first groove 64 may open in a radially inward direction toward the shaft 19 and the second groove 66, while the second groove 66 may open in a radially outward away from the shaft 19 and toward the first groove 64.

In an embodiment, a segmented cover assembly 40 may be mounted in the first and second grooves 64, 66 of the blade mounting region 58 along one or both faces 56 to axially retain the plurality of turbine blades 48 in the plurality of blade mounts 50, to seal cooling air 62 in the blade mounting region 58, to damp vibration, and/or to shield the blade mounting region 58 from hot exhaust gases 36 that may pass between the nozzle body 52 and the turbine rotor 38. The segmented cover assembly 40 may include a plurality of cover segment sets 74 configured to mount in the first and second grooves 64, 66 circumferentially along the blade mounting region 58. For example, the segmented cover assembly 40 may include 1 to 100 (e.g., 1, 2, 3, 4, 5, 6, 7, 8, 9, 10, or more) cover segment sets 74. In an embodiment, the segmented cover assembly 40 may substantially cover the plurality of blade mounts 50 along the upstream and/or downstream faces 56. Each cover segment set 74 may include a seal segment 70 and a cover segment 72. In some embodiments, the segmented cover assembly 40 includes different quantities of seal segments 70 and cover segments 72. For example, only two seal segments 70 may be used with a multiple (e.g., 3, 4, 5, 10, or more) cover segments 72. The segmented cover assembly 40 may also include a split seal segment 70 and a plurality of cover segments 72. In an embodiment, the seal segment 70 may be mounted circumferentially along the second groove 66 and the cover segment 72 may be mounted circumferentially along the first groove 64 adjacent to the seal segment 70. The first groove 64 may have a first groove depth 76 and the second groove 66 may have a second groove depth 78 in the radial direction 43.

Figure 3:
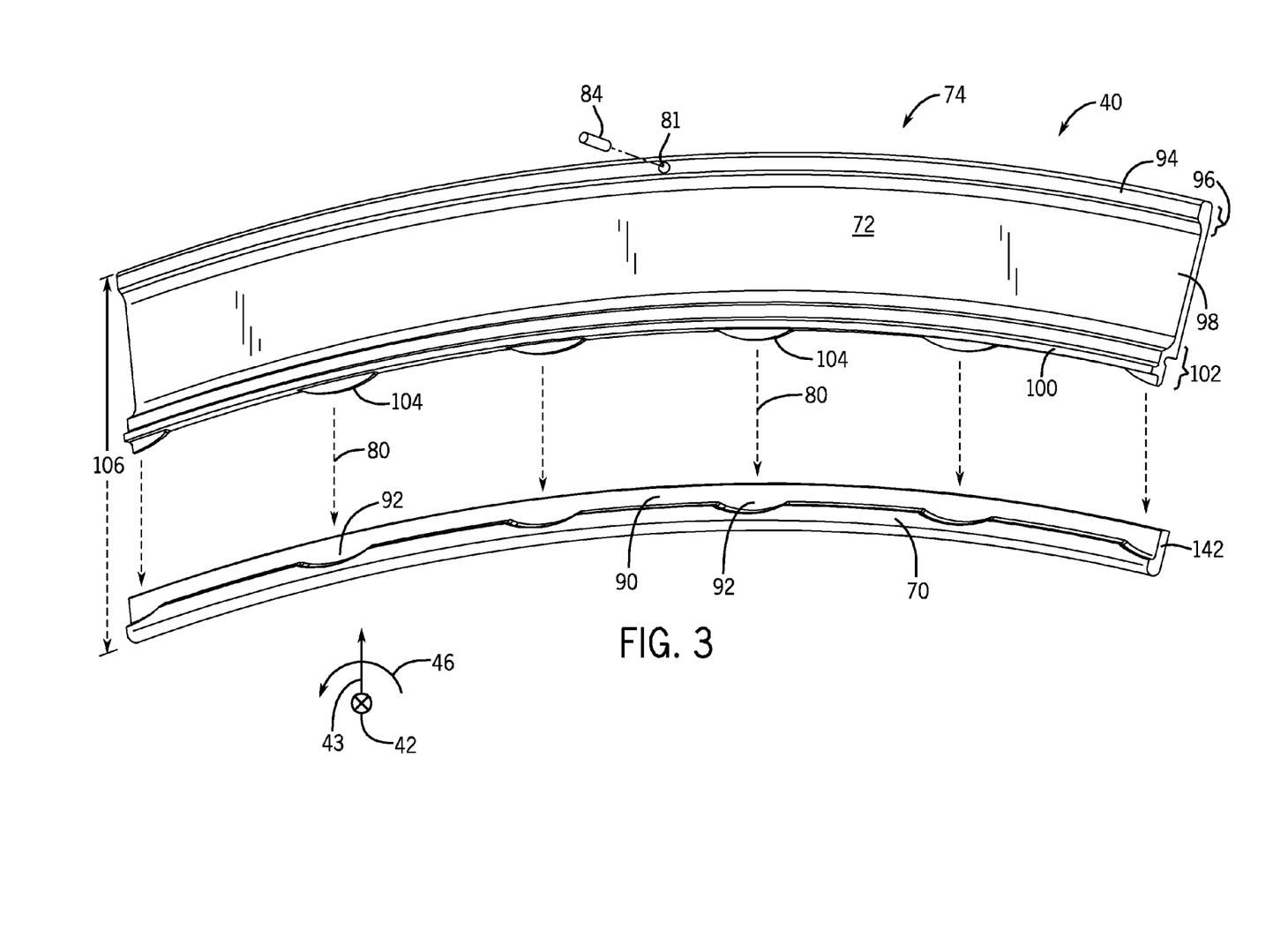
FIG. 3 is an exploded view of an embodiment of a cover segment set including a seal segment and a cover segment.
Figure 4A:
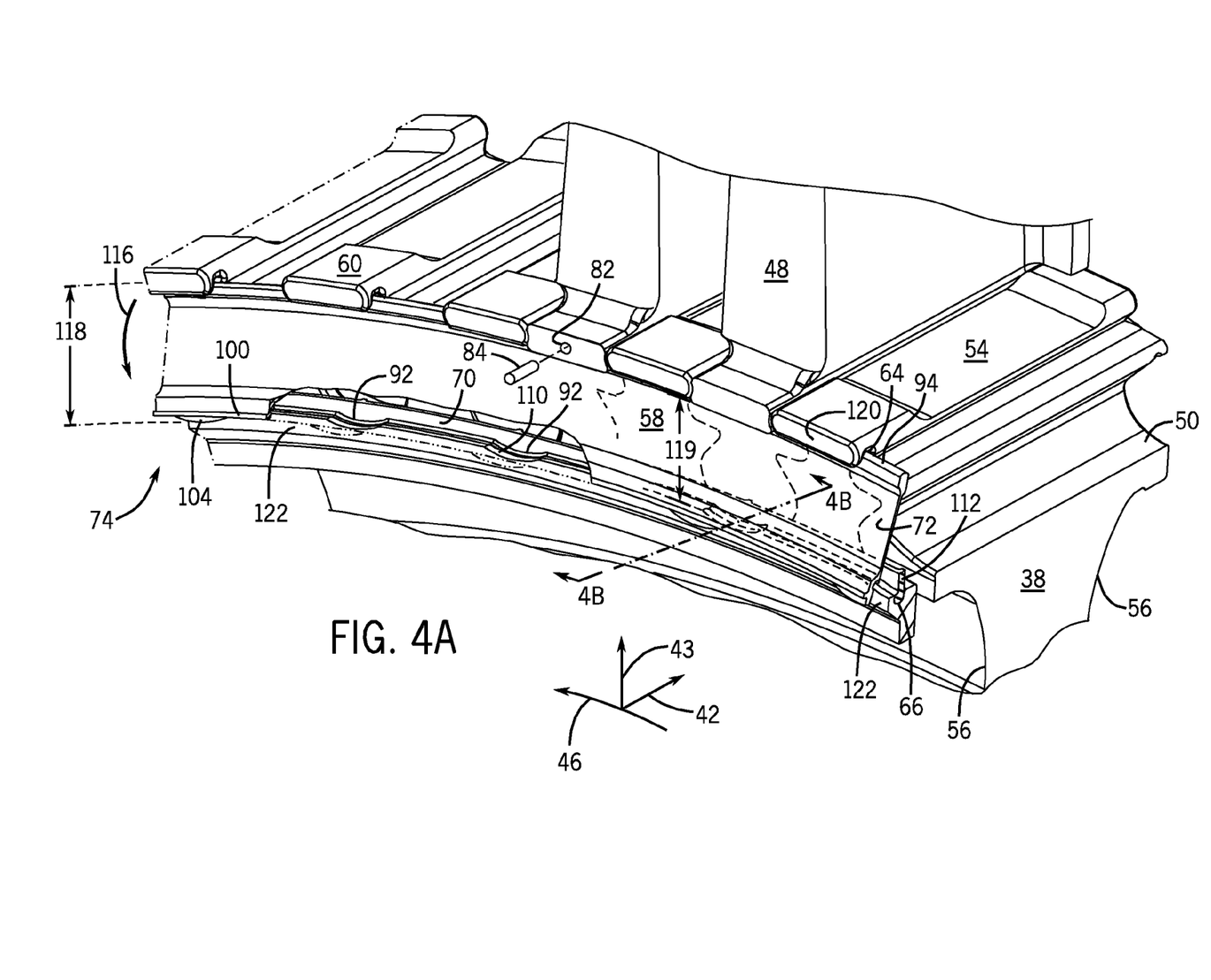
FIG. 4A is a perspective view of an embodiment of a cover segment set partially mounted into in a blade mounting region of a turbine rotor.

FIG. 3 illustrates an embodiment of the seal segment 70 and cover segment 72 of a cover segment set 74 that may be used in the turbine system 10 of FIGS. 1 and 2, or any suitable turbomachine (e.g., compressor, turbine, etc.). Both the seal segment 70 and cover segment 72 are arcuate shaped and configured to mount circumferentially 46 within the first and second grooves 64, 66 shown in FIG. 2. In an embodiment, the seal segment 70 may include a seal body 90 and least one lock feature 92 (e.g., arcuate lock recess, receptacle, or indentation). The cover segment 72 may include a first lip 94 extending along a first circumferential portion 96 of a cover body 98 and a second lip 100 extending along a second circumferential portion 102 of the cover body 98. The second lip 100 may have at least one mating lock feature 104 (e.g., arcuate lock tab, protrusion, or prong). The lock feature 92 may be configured to couple with the mating lock feature 104 as indicated by arrows 80 to form the substantially planar cover segment set 74. In some embodiment, the seal body 90 and cover segment 72 may interface and overlap in the axial direction 42. For example, the mating lock feature 104 and the flange 142 of the seal body 90 may overlap. In various embodiments, both the lock feature 92 and mating lock feature 104 may include one or more recesses, one or more protrusions, or combinations thereof. In some embodiments, the lock feature 92 and mating lock feature 104 may complement each other. In other embodiments, the seal segment 70 may have the mating lock feature 104 and the cover segment 72 may have the lock feature 92. In an embodiment, the coupled cover segment set 74 may have a substantially uniform height 106 with substantially no gaps between the second lip 100 and the seal segment 70. In some embodiments, the cover segment set 74 may have a slot 81 and the blade 48 may have a hole 82 (FIG. 4A). The hole 82 may receive a fastener 84 (e.g., peg, pin) that extends into the cover segment slot 81 to block circumferential 46 movement of the seal segment 70 and cover segment 72 within the first 64 and second grooves 66 after mounting. In some embodiments, only some segmented cover sets 74 of a segmented cover assembly 40 may have a fastener 84. For example, one fastener 84 may block the circumferential 46 movement of a segmented cover set 74, which may block the circumferential movement of other segmented cover sets 74 of the cover assembly 40. In other embodiments, the segmented cover assembly 40 may include 1 to 100 (e.g., 1, 2, 3, 4, 5, 6, 7, 8, 9, 10, or more) fasteners 84.

FIG. 4A illustrates a partially assembled cover segment set 74 of the segmented cover assembly 40 along the mounting region 58 of a turbine rotor 38. The seal segment 70 is mounted circumferentially 46 along the second groove 66. Each turbine blade mount 50 may extend through the turbine rotor body 54, forming a removed portion 110 of the turbine rotor body 54 that extends through the second groove 66 and second rim 122 on at least one face 56 (e.g., upstream and/or downstream face). In some embodiments, the removed portion 110 may be between two adjacent turbine blade mounts 50. The removed portion 110 may be configured to permit turbine blades 48 to be axially 42 mounted without interference from the second groove 66. In an embodiment, the lock feature 92 of the seal segment 70 may be configured to axially 42 align with the removed portion 110 through the second groove 66, and the lock feature 92 may be substantially the same shape as the removed portion 110 (e.g., arcuate or semi-circular). A seal segment 70 with a plurality of features 92 may be mounted in the second groove 66, such that the features 92 may axially 42 align with a plurality of removed portions 110 in a first installation position 112. For the first installation position 112, the first lip 94 of the cover segment 72 may be inserted in the radial direction 43 into the first groove 64 of the rotor body 54. For a second installation position, the first lip 94 of the cover segment 72 is rotated within the first groove 64 to rotate 116 the second lip 100 toward the second groove 66. In an embodiment, the cover segment 72 height 118 including the mating lock feature 104 may be greater than a span 119 between a first rim 120 and a second rim 122 of the blade mounting region 58 between two adjacent blade mounts 50. The first rim 120 includes part of the rotor body 54 and may include parts of one or more turbine blades 48 as discussed below. When rotating 116 the cover segment 72 from the first installed position 112 to the second installation position, the mating lock feature 104 may pass through the removed portion 110 of the rotor body 54 to interface with the lock feature 92. In this way, the lock feature 92 and mating lock feature 104 may be axially 42 and radially 43 aligned with the turbine blade mount 50 in the second installation position. In an embodiment, the cover segment set 74 may have a plurality of lock features 92 and mating lock features 104 circumferentially spaced to substantially match the removed portions 110 and turbine blade mounts 50 of the turbine rotor body 54. The removed portions facilitate mounting both turbine blades 48 and cover segment sets 74.

Figure 4B:
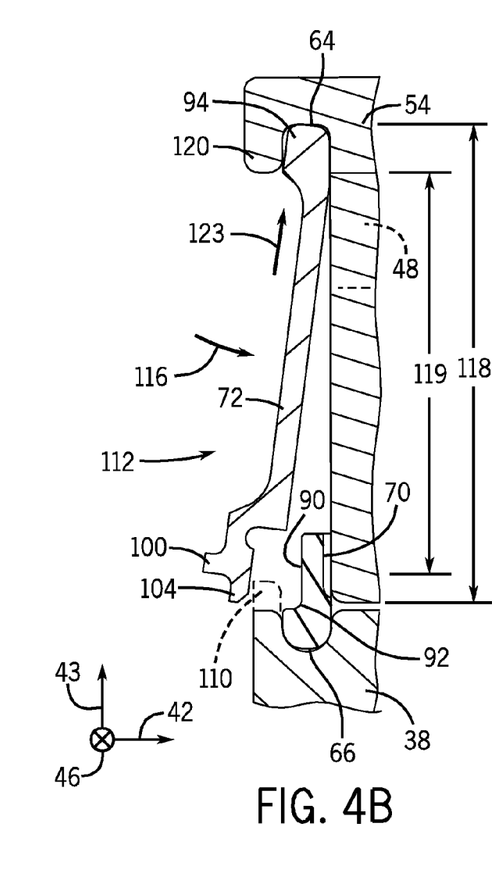
FIG. 4B is a partial cross-sectional view of an embodiment of a cover segment set partially mounted into a blade mounting region of a turbine rotor of FIG. 4A taken within line 4B-4B at a removed portion of the turbine rotor.

FIG. 4B illustrates a cross-section of a partially assembled cover segment set 74 along lines 4B-4B of FIG. 4A. As described above, the seal segment 70 may be mounted circumferentially along the second groove 66 in the first installation position 112 so that the locking feature 92 axially 46 aligns with the removed portion 110 of the second rim 122. In the first installation position 112, the first lip 94 of the cover segment 72 may be inserted in the radial direction 43 as shown by arrow 123 into the first groove 64 of the rotor body 54 or turbine blade 48. The first lip 94 may pivot within the first groove 64 as the second lip 100 rotates 116 toward the seal segment 70 to the second installation position. The mating lock feature 104 rotates 116 through the removed portion 110 of the second rim 122. In the second installation position, the lock feature 92 and mating lock feature 104 interface within the blade mounting region 58.

Figure 5:
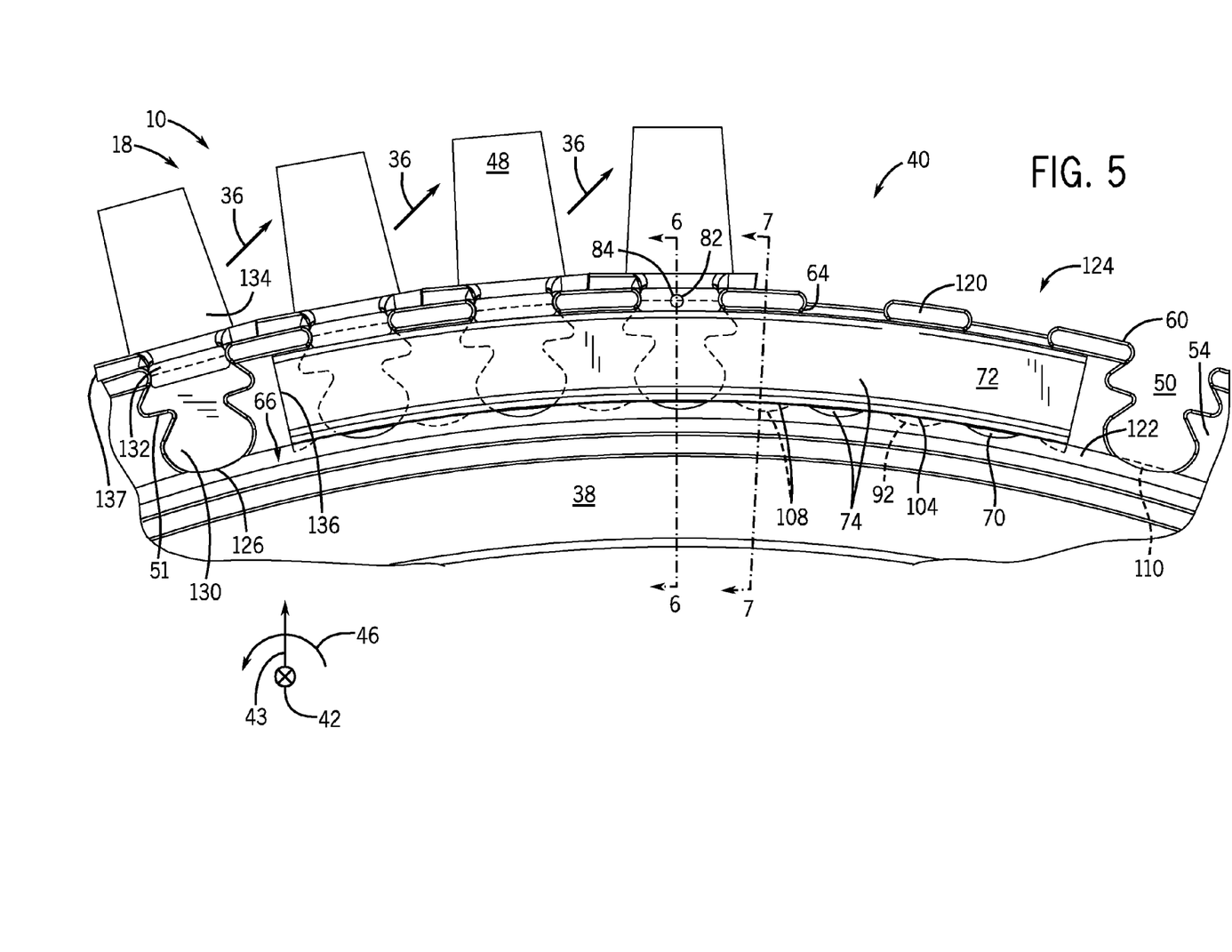
FIG. 5 is a partial front plan view of an embodiment of a turbine rotor including a cover segment set mounted in an intermediate position.

The cover segment set 74 in the second installation position may be configured to rotate (e.g., slide) in the circumferential direction 46 along the first and second grooves 64, 66 to an intermediate position 124 as illustrated in FIG. 5. In the intermediate position 124, the first rim 120 and at least part of the second rim 122 may retain the cover segment set 74 in the axial direction 42. The lock feature 92 and mating lock feature 104, or collectively a lock pair 108, may be aligned between each pair of adjacent blade mounts 50. In an embodiment, a cover segment set 74 with a plurality of lock pairs 108 (e.g., 2 to 10) may be aligned in the intermediate position 124, so that each lock pair 108 is between two blade mounts 50.

As discussed above, the blade mounts 50 may extend through the turbine rotor body 54, and may include axial blade slots 50 (e.g., dovetail slots of a dovetail joint) as shown in FIG. 5. In some embodiments, blade mounts 50 may be machined or broached from the turbine rotor body 54. The blade mounts 50 may also be forged or cast with the turbine rotor body 54. Blade mounts 50 may be configured to radially retain turbine blades 48. Turbine blades 48 mounted in blade mounts 50 may have a blade root 130 (e.g., blade attachment), a blade base 132 (e.g., blade platform), and a blade body 134 (e.g., airfoil). The blade roots 130 may have a complementary shape (e.g., a dovetail protrusion of a dovetail joint) to the blade mounts 50, so that the turbine blades 48 may be radially secured with mounts 50 to form joints 51. For example, the connections between blade roots 130 and blade mounts 50 may include, but are not limited to, threaded, pinned, and dovetailed connections. In an embodiment, blade mounts 50 and bases 132 engage one another in the axial direction 42 with a dovetail shape. In some embodiments, as illustrated in FIG. 5, the shape of the bottom end 126 of the blade roots 130 may be substantially the same shape (e.g., arcuate shape) as the mating lock feature 104 and substantially complement the removed portion 110 and the lock feature 92. The blade base 132 may extend beyond the blade mount 50 of the turbine rotor 38 in the axial direction 42 and circumferential direction 46. In some embodiments, extensions of the blade base 132 in the circumferential direction 46 may protect part of the rotor body 54 perimeter 60 from high temperature exhaust gases 36. In some embodiments, the first groove 64 may extend through extensions of the blade base 132 in the axial direction 42, and the first rim 120 may include at least part of the blade base 132. In this embodiment, the turbine rotor body 38 and/or turbine blade 48 may radially retain the cover segment set 74, while the cover segment set 74 axially retains the turbine blade 48 in both opposite axial directions 42. The turbine rotor body 54 also retains the cover segment set 74 in both axial directions 42.

While only one segment of the turbine rotor 38 is shown in FIG. 5, it should be appreciated that the turbine rotor 38 is annular and extends about the entire circumference of turbine 18. Furthermore, while one cover segment set 74 is shown, embodiments may include multiple cover segment sets 74 (2 to 100 or 10 to 20) that abut each other around the circumferential extent of the turbine rotor 38. For example, certain embodiments may include 2, 3, 4, 5, 6, 7, 8, 9, 10 or more cover segment sets 74 that collectively extend 360 degrees about the turbine rotor 38. As illustrated, the cover segment set 74 extends in circumferential direction 46 to substantially cover five blade mounts 50. In some embodiments, a single split seal ring may be disposed about the entire turbine rotor 38 along the second groove 66 in place of multiple seal segments 70 to form the segmented cover assembly 40 with multiple cover segments 72. Other embodiments may employ cover segment sets 74 that substantially extend over 1, 2, 3, 4, 5, 6, 7, 8, 9, 10, or more blade mounts 50. Furthermore, in some embodiments, each circumferential end 136 of cover segment set 74 is offset from circumferential ends 137 of turbine blade bases 132. In this configuration, the interface between cover segment sets 74 does not circumferentially 43 coincide with the interface between turbine blade bases 132. This arrangement may facilitate increased thermal protection for the turbine rotor 38, because hot exhaust gases 36 may not pass through both the cover segment set 74 and turbine blade base 132 interfaces.

Figure 6:
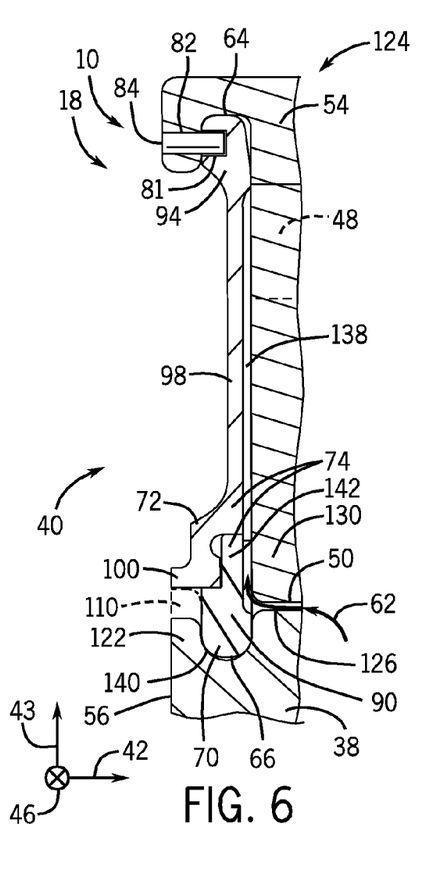
FIG. 6 is a cross-sectional view of an embodiment of the cover segment set of FIG. 5 taken within line 6-6 at a blade mount of the turbine rotor.

FIG. 6 illustrates a cross-section of the cover segment set 74 in the intermediate position 124 at a removed portion 110 and blade mount 50 of the rotor body 54 taken within line 6-6 of FIG. 5. The cover segment set 74 is mounted in the first 64 and second grooves 66 of the blade mounting region 58. In this embodiment, the seal segment 70 mounted in the second groove 66 may be axially 42 retained by the rotor body 54, the second lip 100 of the cover segment 72, and the second rim 122. The seal segment 70 may be radially 43 retained by the second groove 66 and the cover segment 72. Similarly, the first lip 94 of the cover segment 72 may be axially 42 and radially 43 retained by the first groove 64 of the rotor body 54 and seal segment 70. Together, the cover segment set 74 may seal a portion 138 of the mounting region 58 adjacent the turbine blade root 130 (e.g., dovetail protrusion). In some embodiments, a coolant flow, such as cooling air 62, may leak or be directed from the blade mount 50 near the bottom end 126 of the turbine blade root 130 into the sealed portion 138. Cooling air 62 in the sealed portion 138 may cool high temperature and/or high stress regions (e.g., vertex of the dovetail protrusion 130) to extend the useful life of the turbine blade 48, blade mount 50, and combinations thereof.

In some embodiments, the seal segment 70 may have a substantially smooth surface 140 that interfaces with the second groove 66. Opposite the smooth surface 140, the seal body 90 may have a flange 142 that axially 42 and radially 43 overlaps with the second lip 100 in the second groove 66. In the embodiment shown in FIG. 6 of the cover segment set 74 in the intermediate position 124, part of the second lip 100 does not interface with the second rim 122 due to the removed portion 110. The seal segment 70 seals the lower part of the sealed portion 138. Without the seal segment 70, the cover segment 72 alone may not completely seal the sealed portion 138 to circulate the cooling air 62. For example, if only the cover segment 72 were mounted in the intermediate position 124, cooling air 62 may escape to the face 56 of the turbine rotor 38 through the removed portions 110.

In some embodiments, the seal segment 70 and cover segment 72 may be composed of the same or different materials, each with sufficient strength and resilience to withstand high operating temperatures and stresses in both the axial direction 42 and radial direction 43. For example, during rotation of the turbine rotor 38, the seal segment 70 and cover segment 72 may be radially retained primarily by the first groove 64 and experience high compressive stress in the radial direction 43. In some embodiments, a material may be selected based on the material's effect on the resonance of the seal segment 70, the cover segment 72, and/or the cover segment set 74. Properties that affect the resonance may include, but are not limited to, rigidity, density, thickness, and size. In some embodiments, a seal segment 70 may be configured to damp the vibration in a respective cover segment 72 to reduce the resonance response during operation.

Figure 7:
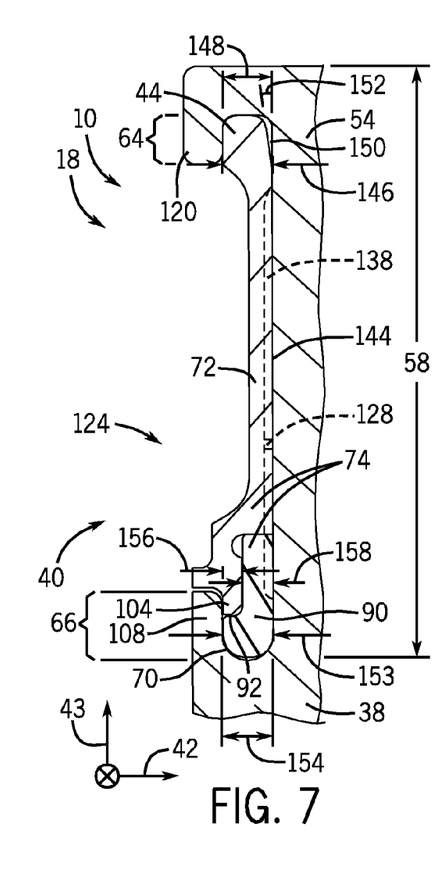
FIG. 7 is a cross-sectional view of an embodiment of the segmented cover assembly of FIG. 5 taken within line 7-7 between two blade mounts of the turbine rotor.

FIG. 7 illustrates a cross-section of the cover segment set 74 in the intermediate position 124 between blade mounts 50 of the rotor body 54 taken within line 7-7 of FIG. 5. As described above, the cover segment set 74 may be radially mounted in the first and second grooves 64, 66 in the mounting region 58. At this cross-section, the seal segment 70 may be axially retained by the rotor body 54, the mating lock feature 104, and the second rim 122. In some embodiments, the lock feature 92 may extend through the seal body 90 so that at least part of the lock feature 92 and at least part of the coupled mating lock feature 104 may be within (e.g., radially inside) the second groove 66. For example, the lock feature 92 may extend in the radial direction 43 and/or the axial direction 42 through approximately 5, 10, 20, 30, 40, 50, 60, 70, 80, 90, or 95% of the seal body 90. As shown in FIG. 7, the second lip 100 may interface with both the seal segment 70 and the second rim 122. In some embodiments, the lock pair 108 may axially retain the cover segment set 74 within the first 64 and second grooves 66, and the cover segment set 74 may consequently axially retain the turbine blades 48 in the turbine blade mounts 50.

At least part of the seal segment 70 and cover segment 72 may interface with the rotor body 54 to form the sealed portion 138 of the blade mounting region 58. In some embodiments, each sealed portion 138 may include part of one blade mount 50. For example, the cover segment set 74 may have one or more sets of sealing ribs 144 that are configured to extend around each blade mount 50 of the plurality of blade mounts 50 about the turbine rotor 38. The sealing ribs 144 may project in the axial direction 42 may interface with the rotor body 54 and turbine blade 48 to form the sealed portion 138 (e.g., axially recessed cavity surrounded by ribs 144). These sealed portions 138 reduce the weight of the cover body 72. The sealing ribs 144 may include or extend along the first lip 94, the second lip 100, the seal body 90, spines 128, and combinations thereof. In other embodiments, the sealed portion 138 may include more than one blade mount 50. For example, the sealing ribs 140 may include or extend along the first lip 94, the seal body 90, and spines 128 near the circumferential ends 134 of the cover segment set 94 to extend over two or more blade mounts 50.

In some embodiments, the first lip thickness 146 may be substantially the same as the first groove width 148. A bevel 150 on the first lip 94 of the cover segment 72 may aid installation of the cover segment 72 into the second installation position through facilitating rotation of the first lip 94 within the first groove 64 as discussed above. The bevel 150 may have an angle 152 between approximately 1 to 60 degrees, approximately 5 to 45 degrees, approximately 10 to 30 degrees, or approximately 15 to 25 degrees. The first lip thickness 146 may be configured to both substantially seal the sealed portion 138 and rotate circumferentially along the first groove 64. The seal segment thickness 153 may be configured to be substantially the same as the second groove width 154. The lock pair 108 thickness 156 and flange thickness 158 may be configured to be substantially the same as the second groove width 154 to substantially seal the sealed portion 138 and rotate circumferentially within the second groove 66.

Figure 8:
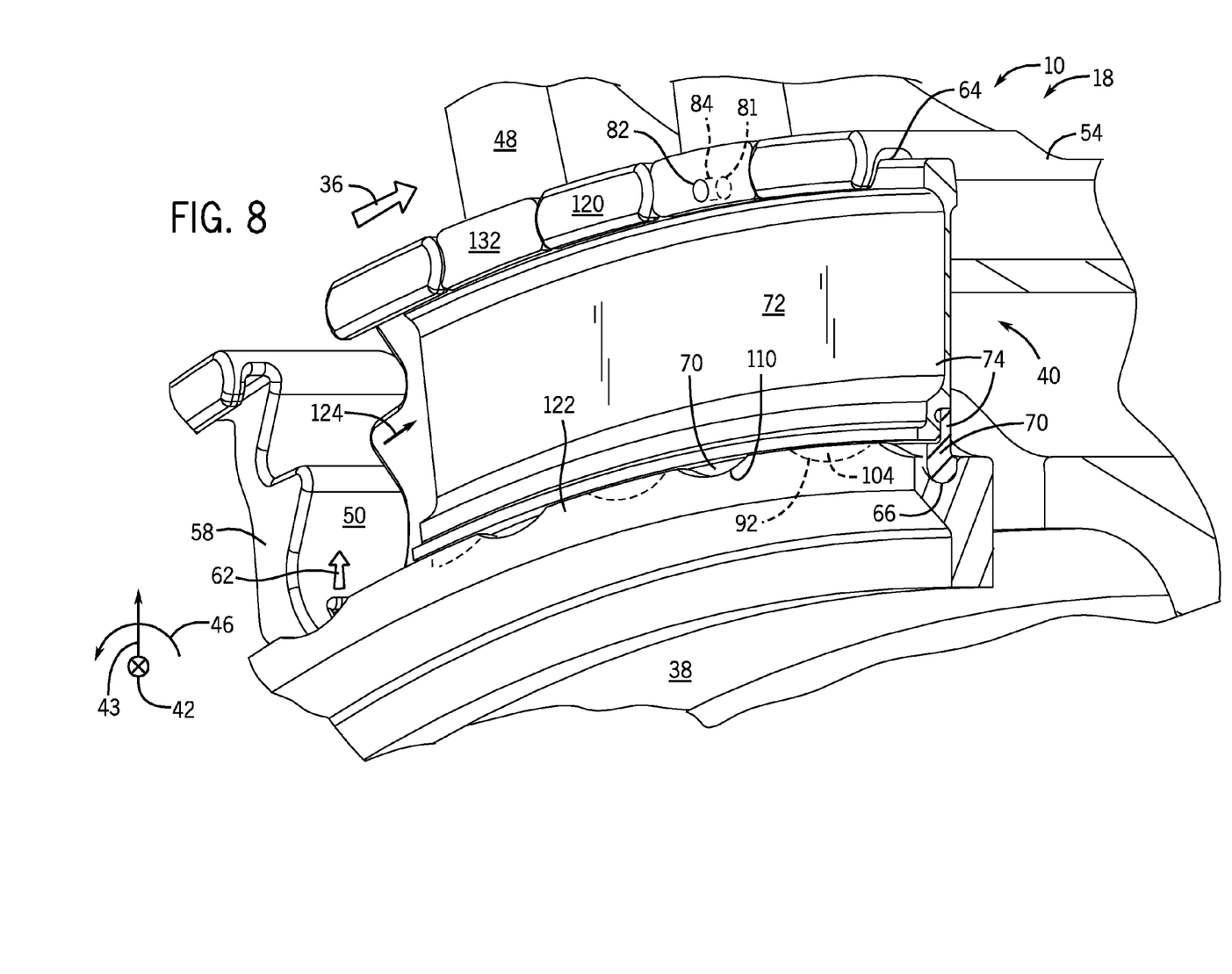
FIG. 8 is a partial perspective view of an embodiment of the cover segment in an intermediate position mounted along a blade mounting region of a turbine rotor.

FIG. 8 illustrates a perspective view of the cover segment set 74 mounted in the intermediate position 124 of the blade mounting region 58 of the turbine rotor 38. In this position 124, the seal segment 70 may be exposed to exhaust gases 36 through the removed portion 110. However, as discussed above, the seal segment 70 may shield the blade mounting region 58 from the exhaust gases 36 and seal a coolant flow 62 to circulate about the turbine mount 50. The lock feature 92 and mating lock feature 104 may be axially retained by the second rim 122 within the second groove 66 to removably secure the cover segment set 74 in the intermediate position 124.

Upon installation of a plurality of cover segment sets 74 of the segmented cover assembly 40 to substantially cover the plurality of blade mounts 50, the cover assembly 40 may be circumferentially 46 secured with each cover segment set 74 in the intermediate position 124 by at least one fastener 84 (e.g., pin). In some embodiments, the fastener 84 may be a pin or bolt inserted into a hole 82 of the rotor body 54 or mounted turbine blade 48 and matching hole or slot in the cover segment 72. For example, one cover segment 72 of the cover assembly 40 may be pinned to the first rim 120 of a turbine blade base 132 as illustrated in FIG. 8. In some embodiments, the fastener 84 may be configured to substantially maintain the rotational stability of the turbine rotor 38. For example, fasteners 84 may be mounted in a rotationally symmetric manner about the turbine rotor 38 to distribute the mass of the fasteners 84 about the turbine rotor 38. In addition, fastener 84 may permit field servicing of the turbine rotor 38 with minimal small or complex parts.

A method of installing a cover assembly 40 in a turbine rotor 38 to retain turbine blades 48, shield the turbine rotor 38 from exhaust gases 36, damp vibration, and/or seal cooling air 36 in the blade mounting region 58 may include numerous steps. For example, turbine blades 48 may be inserted (e.g., axially 42) into blade mounts 50 (e.g., axial dovetail slots) of the rotor body 54. A seal segment 70 with at least one lock feature 92 may be inserted into the second circumferential groove 66 of the turbine rotor 38. Then, a first lip 94 of a cover segment 72 may be inserted into a first circumferential groove 64 that is radially offset from the second groove 66. The cover segment 72 then may be rotated about the first lip 94 within the first groove 64 to move the second lip 100 toward the second groove 66. In some embodiments during installation, at least one mating lock feature 104 of the cover segment set 72 may rotate through a removed portion 110 of the turbine rotor 38 that substantially aligns with a blade mount 50. Each lock feature 92 of the seal segment 70 may be coupled to a respective mating lock feature 104 of the cover segment 72 to form a cover segment set 74 within the blade mounting region 58. Once all of the available circumference has been filled with cover segment sets 74, the cover segment sets 74 may be circumferentially 46 moved along the first and second grooves 64, 66 to an intermediate position 124 (e.g., lock pair 108 between adjacent blade mounts 50). The intermediate position 124 may be circumferentially 46 between blade mounts 50 and/or between removed portions 110. Fasteners 84 may removably secure the cover segment sets 74 circumferentially in the intermediate position 124. In some embodiments, the cover segment set 74 may be mounted in the blade mounting region 58 differently than described above. For example, the cover segment 72 may be inserted into the second groove 66, and then the seal segment 70 may be inserted into the first groove 64. In another embodiment, the first and second grooves 64, 66 may not radially oppose one another. In another embodiment, the removed portion 110 may be from the first groove 64 or second groove 66. The removed portion may not substantially axially align with a blade mount 50 or be substantially the same shape of the bottom end 126 of the blade root 130.

Technical effects of the invention include a segmented cover assembly 40 with a plurality of cover segment sets 74, each cover segment set 74 having a seal segment 70 with a lock feature 92 and a cover segment 72 with a mating lock feature 104. The seal segment 70 and cover segment 72 may be coupled by the respective lock feature 92 and mating lock feature 104 to form a substantially planar cover segment set 74. The cover segment set 74 may be configured to be radially inserted into first 64 and second grooves 66 in a second installation position before being circumferentially rotated to an intermediate position 124. In the intermediate position 124, the cover segment set 74 may retain turbine blades 48, shield the turbine rotor 38 from exhaust gases 36, damp vibration, and/or seal cooling air 36 in the blade mounting region 58. Additionally, a removed portion 110 through the second rim 122 may be formed with the blade mount 50, and the shape of removed portion 110 may be substantially the same shape as the lock feature 92 that substantially complements the mating lock feature 92. Multiple cover segment sets 74 may form a cover assembly 40 with a minimal number of parts, particularly small parts, providing for simplified assembly and maintenance of the turbine rotor 38 without substantially negatively affecting the stability of the turbine rotor 38 due to vibration and/or imbalance of the turbine rotor 38.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   mounting a cover segment set in first and second grooves circumferentially along a blade mounting region of a turbine rotor, wherein mounting comprises:
   inserting a seal segment into the second groove, wherein the seal segment comprises a lock feature;
   inserting a first lip of a cover segment into the first groove after inserting the seal segment into the second groove;
   inserting a second lip of the cover segment into the second groove adjacent the seal segment after inserting the first lip of the cover segment into the first groove, wherein the first and second lips extend along first and second circumferential portions of a cover body at an offset from one another, and the second lip includes a mating lock feature; and
   locking the cover segment to the seal segment to form a cover segment set via coupling of the lock feature with the mating lock feature after inserting the second lip of the cover segment into the second groove adjacent the seal segment.

2. The method of claim 1, comprising rotating the cover plate while the first lip is disposed within the first groove to move the second lip toward the second groove after inserting the first lip of the cover segment into the first groove.

3. The method of claim 1, comprising moving the cover segment set circumferentially along the first and second grooves to an intermediate position between a first blade mount and a second blade mount in the blade mounting region.

* * * * *